United States Patent
Preiser

[15] 3,681,675
[45] Aug. 1, 1972

[54] SHUT-OFF ARRANGEMENT FOR THE POWER CONTROLLED RECTIFIERS OF A DC TO AC INVERTER

[72] Inventor: Mark E. Preiser, Sterling Heights, Mich.

[73] Assignee: General Motors Corporation, Detroit, Mich.

[22] Filed: Aug. 26, 1971

[21] Appl. No.: 175,135

[52] U.S. Cl. .......................321/5, 318/227, 321/45 C
[51] Int. Cl. ..............................................H02m 7/48
[58] Field of Search..................321/5, 45 C; 318/227

[56] References Cited

UNITED STATES PATENTS

| | | | |
|---|---|---|---|
| 3,321,697 | 5/1967 | Etter | 321/45 C |
| 3,331,011 | 7/1967 | Landis | 321/45 C |
| 3,449,654 | 6/1969 | Sheldrake et al. | 321/45 C |
| 3,392,318 | 7/1968 | Huntzinger | 321/45 C |
| 3,544,879 | 12/1970 | King | 321/5 |
| 3,543,131 | 11/1970 | Johnston | 321/5 |

Primary Examiner—William M. Shoop, Jr.
Attorney—E. W. Christen et al.

[57] ABSTRACT

A controlled rectifier inverter interconnects a principal source of direct voltage with an AC induction motor to develop AC excitation for the motor. Auxiliary commutation of the inverter power controlled rectifiers is provided by a shut-off source of direct voltage, a shut-off capacitor, and a plurality of shut-off controlled rectifiers. Alternate commutations are effected by applying the voltage accumulated on the shut-off capacitor first through shut-off controlled rectifiers in voltage opposition to the principal source of direct voltage to reverse bias and shut off power controlled rectifiers in a first group, and second, through shut-off controlled rectifiers in circuits including the shut-off source of direct voltage and excluding the principal source of direct voltage to shut off power controlled rectifiers in a second group. Successive commutations alternate between power controlled rectifiers of the first and second groups.

2 Claims, 4 Drawing Figures

INVENTOR.
Mark E. Preiser
BY C. R. Meland
ATTORNEY

SHUT-OFF ARRANGEMENT FOR THE POWER CONTROLLED RECTIFIERS OF A DC TO AC INVERTER

This invention relates to an inverter interconnecting a principal source of direct voltage with an AC induction motor load and in particular to auxiliary shut-off circuitry included in the inverter to terminate conductive intervals by power controlled rectifiers.

Prior art inverter arrangements use auxiliary shut-off capacitors for energy storage to terminate conductive intervals by power controlled rectifiers in inverters supplying AC loads, including induction motors, from direct voltage sources. In these known shut-off arrangements, the voltage accumulated on the capacitor is applied directly across the power controlled rectifier to be shut off in a circuit excluding the principal source of direct voltage. Continuity of current to the motor is maintained in these arrangements during commutation through a path from one terminal of the principal source of direct voltage through the shut-off capacitor, the shut-off controlled rectifier, the load, and a power controlled rectifier to the other terminal of the principal source of direct voltage. Accordingly, voltage accumulated on the capacitor can attain a high level in view of the series connection of the motor and the principal source with the shut-off capacitor. Some prior art systems include free-wheeling diodes connected with the load to limit this voltage build-up on the shut-off capacitors. However, these diodes prove to be a burden during commutation since they are forward biased by shut-off voltage applied to shut off a given power controlled rectifier. By contrast with the prior art wherein diodes and shut-off circuits exclusive of the principal voltage source are generally used, the present invention effects power controlled rectifier commutation by alternately connecting a single capacitor serially with an auxiliary shut-off source of direct voltage across a selected power controlled rectifier to be shut off or across the series combination of the principal source of direct voltage and a selected power controlled rectifier to be shut off.

In the arrangement of the present invention, inverter power controlled rectifiers are separated into two groups to be reverse biased: one group is connected with the positive terminal of the principal source of direct voltage and one group is connected with the negative terminal of the principal source of direct voltage, and successive commutations alternate between power controlled rectifiers in the two groups. This arrangement affords simplified commutation without the necessity of free-wheeling diodes with a minimum of auxiliary shut-off circuitry.

Free-wheeling diodes, as noted above, are included in prior art inverter arrangements to enhance inverter operation. Wave shape improvement, spike clipping, and reverse power paths are provided by the free-wheeling diodes. The shut-off configuration of the present invention is suitable to accommodate reactive power and is effective to reduce voltage spikes, thus eliminating the need for free-wheeling diodes. Nonetheless, if it is deemed necessary for the particular application to include free-wheeling diodes, they can be placed in the circuit at the most advantageous location free of considerations relating to the auxiliary shut-off circuitry.

In view of the foregoing, it is an object of the present invention to provide an inverter interconnecting a principal source of direct voltage with an AC induction motor load including power controlled rectifiers separated into two groups for commutation wherein auxiliary commutation circuitry including a plurality of shut-off controlled rectifiers, a shut-off source of direct voltage, and a shut-off capacitor is effective to alternately shut off power controlled rectifiers in the two groups and wherein the shut-off circuit paths for the first group of power controlled rectifiers include the shut-off capacitor, a shut-off controlled rectifier, the power controlled rectifier from the first group to be shut off, and the principal source of direct voltage and the shut-off circuit paths for the second group include the shut-off source of direct voltage, the shut-off capacitor, a shut-off controlled rectifier, and the power controlled rectifier from the second group to be shut off.

Another object of the present invention is to provide a controlled rectifier inverter interconnecting a direct voltage source with an AC induction motor wherein a single shut-off capacitor in conjunction with a shut-off source of direct voltage and a plurality of shut-off controlled rectifiers control the times of commutation for the inverter power controlled rectifiers.

Another object of the present invention is to provide a commutation means of the type described for power controlled rectifiers included in inverter motor supply arrangements for powering Y-connected, Delta-connected, or separately connected motor windings.

These and other objects and advantages of the present invention will be apparent from the following description incorporating the following figures wherein.

Figure 1:
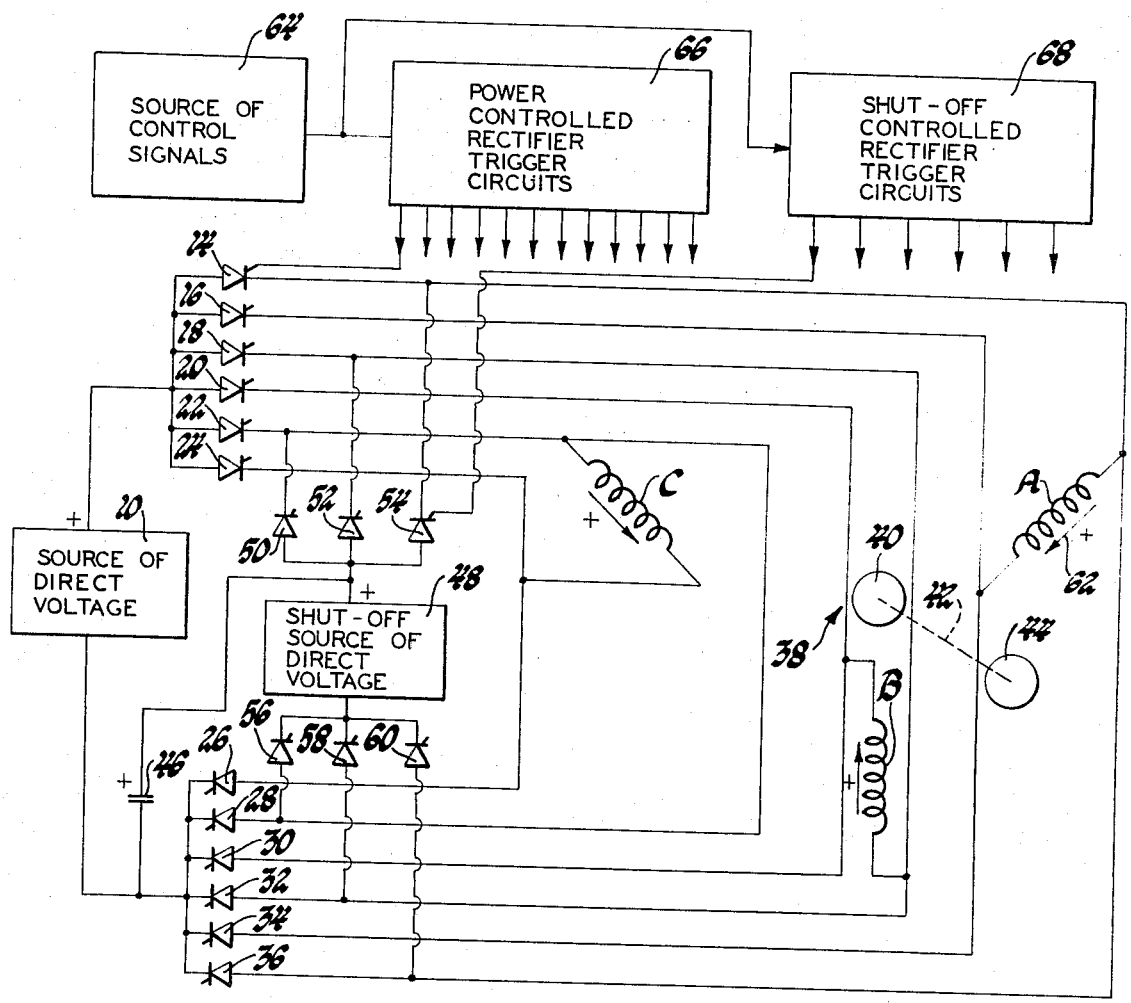
FIG. 1 is a circuit schematic of a controlled rectifier inverter supplying AC excitation from a source of direct voltage to an AC induction motor having separately connected phase windings wherein the inverter includes shut-off circuitry according to the present invention.

Reference should now be made to the drawing of FIG. 1 wherein a controlled rectifier inverter supplies alternating voltage to an AC induction motor from a principal source of direct voltage. In this voltage supply arrangement, the principal source of direct voltage 10 is connected with 12 power controlled rectifiers 14, 16, 18, 20, 22, 24, 26, 28, 30, 32, 34, and 36 to provide AC excitation for the induction motor 38 which has its rotor 40 connected through linkage 42 with a load 44. The induction motor 38 has three phase windings A, B, and C separately wound on the motor and electrically isolated from each other. Each of the windings is connected through two current paths with the principal source of direct voltage; each current path includes a power controlled rectifier connected between the positive terminal of the source 10 and one end of its respective phase winding and a power controlled rectifier connected between the negative terminal of the source 10 and the other end of the phase winding. The two paths connected with each winding allow current excitation of both senses to be controllably supplied each phase winding as is more fully described hereinafter.

The source of direct voltage 10 can take a variety of forms, including provision for a variable voltage output if desired for a particular application. A full-wave bridge rectifier can be used to develop the requisite DC voltage output for the source 10 from an AC input, and controlled rectifiers can be included in the bridge for voltage regulation. Other known DC source arrangements could also be used.

Inasmuch as the inverter is supplied from a direct voltage source, it is necessary to provide auxiliary commutation or shut-off means to terminate conductive intervals by the various power controlled rectifiers. Accordingly, shut-off circuitry including a shut off capacitor 46, a shut-off source of direct voltage 48 and six shut-off controlled rectifiers 50, 52, 54, 56, 58, and 60 is included in the inverter of the drawing. Voltage source 48 can take a variety of forms including those suggested above for the source 10. The power rating of the source 48 will be determined by the power demand during operation; a programmed source can be used to continually regulate the output level, if desired.

The power controlled rectifiers 14 to 36 provide current excitation paths, as noted above, such that each of the three phase windings A, B, and C can be supplied excitation currents of both senses. For example, power controlled rectifiers 14 and 34 connect the phase winding A with the source of direct voltage 10 such that excitation current of the sense indicated by the arrow 62 is supplied phase winding A when these two controlled rectifiers are simultaneously conducting, and controlled rectifiers 16 an 36 provide a power excitation circuit for supplying phase winding A with current of the opposite sense when they are simultaneously conducting. Similarly, the pair of controlled rectifiers 18, 30 and 20, 32 afford excitation connections to supply phase winding B with currents of both senses. And phase winding C is supplied through circuit paths including the pairs of controlled rectifiers 22, 26 and 24, 28. Thus, it should be appreciated that six current paths are completed by the 12 power controlled rectifiers to supply the three phase windings the excitation currents requisite for normal induction motor operation. The three arrows shown in the drawing adjacent their respective phase windings represent a reference direction for current in the phase windings accompanying the application of positive voltage to the windings.

The six power controlled rectifiers 14 to 24 have their anodes connected with the positive terminal of the source of direct voltage 10, and the six power controlled rectifiers 26 to 36 have their cathodes connected with the negative terminal of the source of direct voltage 10. Each of the six circuit paths supplying the phase windings includes one power controlled rectifier from those connected with the positive terminal and one from those connected with the negative terminal of the source 10. For commutation, two groups of power controlled rectifiers are connected with respective shut-off controlled rectifiers. Power controlled rectifiers 14, 18, and 22 comprise a first group for commutation; their cathodes respectively connect with the cathodes of a first group of shut-off controlled rectifiers 54, 52, and 50. It is noted that each of the three power controlled rectifiers 14, 18, and 22 connects to a different one of the phase windings A, B, and C. Power controlled rectifiers 28, 32, and 36 comprise a second group for commutation; their anodes respectively connect with the anodes of a second group of shut-off controlled rectifiers 56, 58, and 60. As with the first group of power controlled rectifiers, each power controlled rectifier of the second group is connected to a different one of the phase windings A, B, and C. It is important to note that the current excitation paths of the power controlled rectifiers 28, 32, and 36 are different from the current excitation paths of the power controlled rectifiers 14, 18, and 22. Thus, each of the six current paths supplying the motor includes one power controlled rectifier from either the first or second group.

The anodes of shut-off controlled rectifiers 50, 52, and 54 are commonly connected with the positive terminal of the shut-off source of direct voltage 48. The cathodes of the shut-off controlled rectifiers 56, 58, and 60 are commonly connected with the negative terminal of the shut-off source of direct voltage 48. Shut-off capacitor 46 is connected from a terminal of the shut-off source of direct voltage 48 having a first polarity to a terminal of the principal source of direct voltage 10 of opposite polarity. This is shown in the drawing as a connection between the positive terminal of the shut-off source of direct voltage 48 and the negative terminal of the source of direct voltage 10.

Control of the inverter and concurrently the motor 38 is effected in accordance with control signals from a source of control signals 64 connected to both a first gate control means shown as power controlled rectifier trigger circuits 66 and a second gate control means shown as shut-off controlled rectifier trigger circuits 68. Motor control in accordance with known induction motor slip speed control is effected if the source of control signals 64 takes the form of a tachometer and slip frequency generator control such as that shown in U.S. Pat. No. 3,323,032 Agarwal et al. The development of trigger signals by the trigger circuits 66 and 68 is accomplished according to any of a variety of known trigger schemes. An example of a logic array suitable for developing the requisite trigger signals is the system of copending application, Ser. No. 60,398, filed Aug. 3, 1970, in the name of Richard W. Johnston et al., and entitled "Shutter Wheel Tachometer." Although the system of Ser. No. 60,398 involves an inverter having six rather than 12 power controlled rectifiers, the necessary modification for adapting that system to the present invention is readily made by one skilled in the art; it is merely necessary to trigger two controlled rectifiers on each occasion of a trigger pulse rather than one.

The output signals from trigger circuits 66 and 68 are represented in the drawing by arrows. It should be understood that in an actual inverter, a gate and cathode interconnection for each controlled rectifier with the respective trigger circuits is required.

Figure 2:
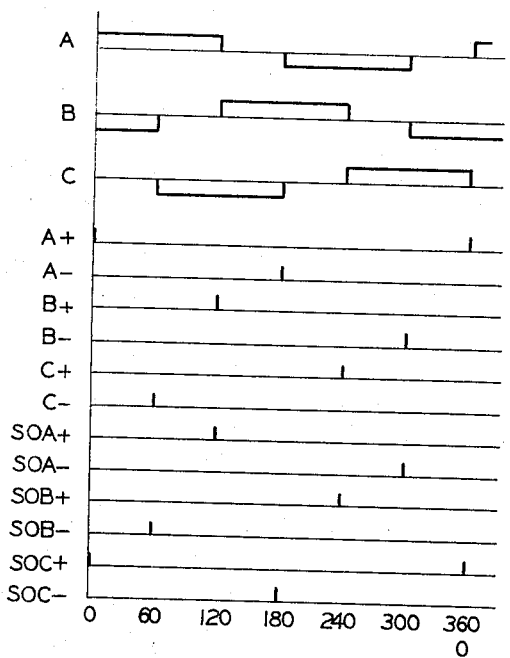
FIG. 2 is a timing diagram defining motor excitation and inverter control for the inverter circuits of both FIGS. 1 and 3.
Figure 3:
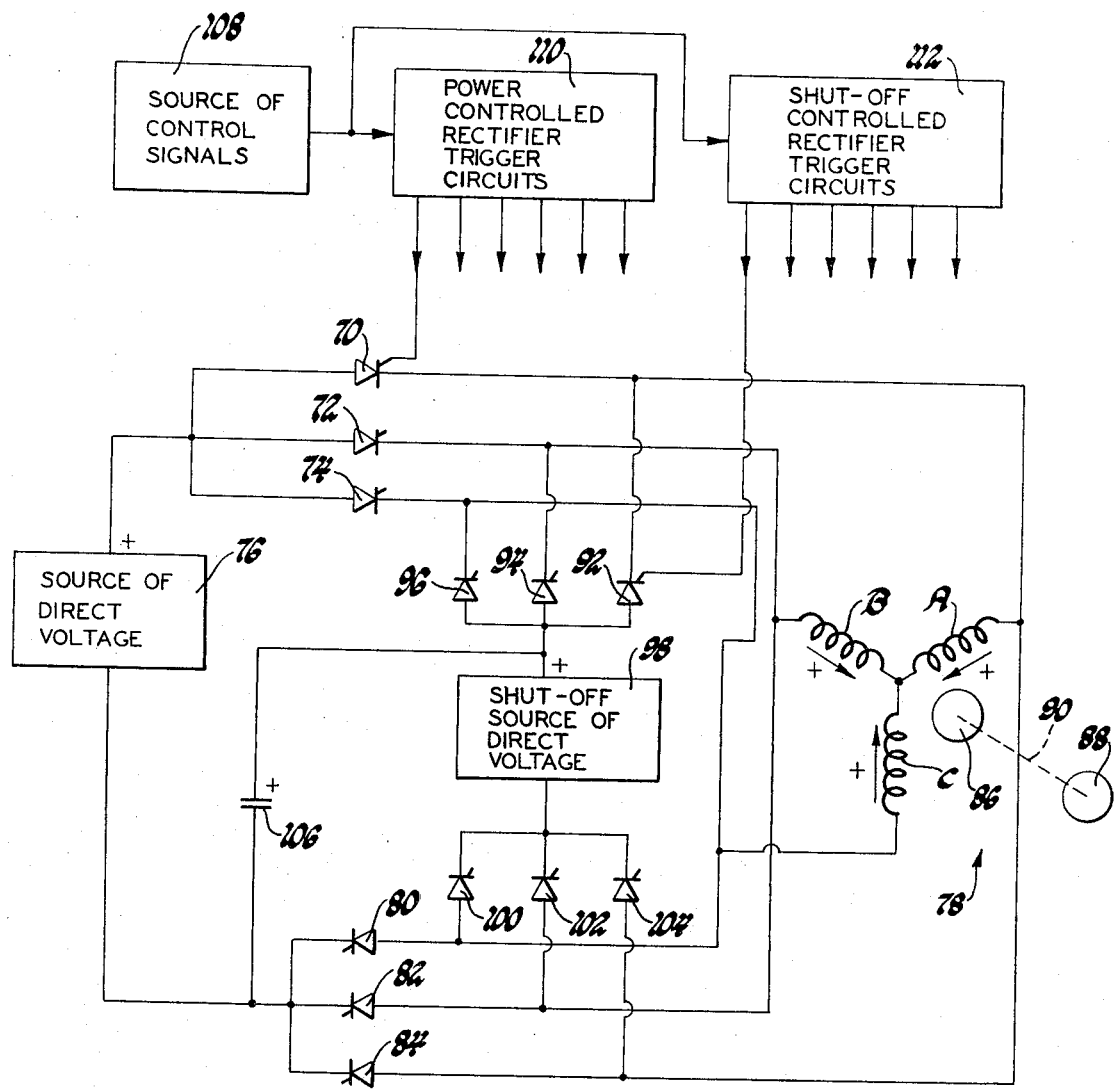
FIG. 3 is a circuit schematic of a controlled rectifier inverter supplying AC excitation to a Y-connected induction motor from a source of direct voltage including auxiliary shut-off circuitry according to the present invention.

Reference should now be made to FIG. 2 which is a timing and sequence summary of the operation of the inverters shown in both FIGS. 1 and 3. Waveforms A, B, and C depict the excitation voltage supplied phase windings A, B, and C, respectively. It should be noted that each winding is supplied alternate positive and negative voltage pulses of 120° duration separated by 60° deenergized intervals. The actual waveforms observed across an operating winding would, of course, differ from the rectangular waveforms of FIG. 2 in view of the system inductance. At the conclusion of each 60° of motor operation, one voltage excitation interval concludes and one voltage excitation interval begins. Trigger signals shown in FIG. 2 and applied to respective shut-off and power controlled rectifiers govern this sequential switching.

Trigger pulse trains A+, A−, B+, B−, C+, and C− depict the trigger signals supplied to power controlled rectifiers from the trigger circuits 66 to initiate the respective voltage excitation intervals. Thus, A+ trigger pulses gate controlled rectifiers 14 and 34 at 0° and at 360° (0° of subsequent cycle) to initiate the positive voltage for the winding A, and A− trigger pulses, occurring each cycle at 180°, gate controlled rectifiers 16 and 36 to initiate the voltage pulse A− for phase winding A. Similarly, B+, B−, C+, and C− trigger pulses gate their respective controlled rectifiers at the appointed times in each cycle to provide the connections between phase windings B and C and the source required to develop the voltage excitation of waveforms B and C.

Shut-off trigger pulse trains SOA+, SOA−, SOB+, SOB−, SOC+, and SOC− are provided by trigger circuits 68 to gate respective shut-off controlled rectifiers to terminate conduction through the excitation paths to terminate particular voltage excitation intervals. Each shut-off trigger pulse terminates a similarly identified voltage pulse; SOA+ terminates A+, etc. Commutation of voltage pulse A+ occurs at 120° when trigger pulse SOA+ gates controlled rectifier 54 to terminate conduction through controlled rectifiers 14 and 34 concluding the positive voltage pulse of waveform A. Similarly, SOA− gates shut-off controlled rectifier 60 at 300° to terminate conduction though the current path providing the negative voltage of waveform A to the phase winding A. In a similar fashion, the shut-off trigger pulses SOB+, SOB−, SOC+, and SOC− gate respectively shut-off controlled rectifiers 52, 58, 50, and 56 to terminate voltage intervals for the phase windings B and C.

It should be understood that commutation alternates between the controlled rectifiers 14, 18, and 22 comprising the first group of power controlled rectifiers and controlled rectifiers 28, 32, and 36 comprising the second group of power controlled rectifiers. Considering the operation depicted in FIG. 2 in the first 120°, the following occurs. At 0°, the positive voltage supplied phase winding C between 240° and 360° must be terminated, and accordingly, a trigger pulse SOC+ is applied to gate shut-off controlled rectifier 50 conductive to connect shut-off capacitor 46, charged with the polarity indicated, across the series combination of power controlled rectifier 22 and the source of direct voltage 10. Thus, in view of the polarity and level of the voltage accumulated on capacitor 46 and the fact that this voltage level exceeds the amplitude of the principal source of direct voltage 10, the power controlled rectifier 22 is reverse biased in a circuit path from the positive plate of shut-off capacitor 46, through shut-off controlled rectifier 50, through power controlled rectifier 22, and through the principal source of direct voltage 10 to the negative plate of capacitor 46. After power controlled rectifier 22 ceases conduction, voltage remaining on capacitor 46 is supplied the induction motor load through a path from the positive plate of capacitor 46, through shut-off controlled rectifier 50, through the phase winding C, and through power controlled rectifier 26 to the negative plate of the capacitor 46. In this manner, the polarity of capacitor 46 is reversed and energy stored in the electric field of the capacitor as well as energy stored in the magnetic field of phase winding C is accumulated in the capacitor voltage during the reverse charging process. When the capacitor 46 attains full charge, no current flows through shut-off controlled rectifier 50, phase winding C, and power controlled rectifier 26, and accordingly, the two controlled rectifiers cease conduction. Also occurring at 0° is the initiation of the positive voltage pulse to phase winding A when an A+ trigger is provided to gate controlled rectifiers 14 and 34 conductive.

At 60°, the negative voltage pulse to phase winding B is terminated. This is accomplished by providing an SOB− trigger pulse to gate shut-off controlled rectifier 58 conductive connecting the shut-off source of direct voltage and the shut-off capacitor 46 (charged with a polarity opposite to that indicated in the drawing) in a voltage combining circuit directly across power controlled rectifier 32 to reverse bias and terminate conduction through that power controlled rectifier. After conduction by power controlled rectifier 32 terminates, the capacitor 46 is connected in a feed circuit with the phase winding B, traced from the capacitor 46 through the principal source of direct voltage 10, through power controlled rectifier 20, through phase winding B, through shut-off controlled rectifier 58, and through the shut-off source of direct voltage 48 to the capacitor 46. In this manner, energy in the electric and magnetic fields of the capacitor and phase winding is effective to recharge the shut-off capacitor with the polarity shown in the drawing. Additionally, the voltage of both direct voltage sources aids in this charging process. To commence the C− energization of phase winding C which has been unenergized for 60°, a C− trigger pulse is developed at the 60° point to gate controlled rectifiers 24 and 28 conductive.

The next subsequent commutation occurs at 120° when the SOA+ trigger pulse gates shut-off controlled rectifier 54 to reverse bias power controlled rectifier 14. The analysis of inverter operation at the time of this commutation is similar to that set out above with reference to the termination of the positive voltage pulse to the phase winding C. The entire inverter operation is readily apprehended by a joint consideration of the timing diagram of FIG. 2 and the inverter schematic of FIG. 1. Considering the shut-off circuits, it should be appreciated that successive commutations involve, alternately, controlled rectifiers of the first group including power controlled rectifiers 14, 18, and 22 and then of the second group including power controlled rectifiers 28, 32, and 36, etc.

Reference should now be made to the circuit schematic of FIG. 3 wherein a Y-connected induction motor is supplied AC voltage from a direct voltage source through a controlled rectifier inverter. A first group of power controlled rectifiers 70, 72, and 74 are connected such that their anodes commonly connect with the positive terminal of a source of direct voltage 76 and their cathodes connect respectively to input terminals of phase windings A, B, and C of an AC induction motor 78. A second group of power controlled rectifiers 80, 82, and 84 are connected such that their cathodes commonly connect with the negative terminal of the source of direct voltage 76 and their anodes connect respectively to the input terminals of the induction motor 78. The motor 78 has a squirrel-cage rotor 86 which drives a motor load 88 through an output connection 90. In like manner to the discussion above with respect to the source 10 of FIG. 1, the source of direct voltage 76 can take a variety of forms generally known in the art.

A first group of three shut-off controlled rectifiers 92, 94, and 96 are connected such that their anodes commonly connect with the positive terminal of a shut-off source of direct voltage 98 and their cathodes respectively connect with the cathodes of the first group of power controlled rectifiers 70, 72, and 74. A second group of three shut-off controlled rectifiers 100, 102, and 104 are connected such that their cathodes commonly connect with the negative terminal of the shut-off source of direct voltage 98 and their anodes respectively connect with the anodes of the second group of power controlled rectifiers 80, 82, and 84. A shut-off capacitor 106 interconnects the shut-off source of direct voltage 98 with the principal source of direct voltage 76. This capacitor connects to a terminal of a first polarity, shown in the drawing as the positive terminal, of the sut-off source of direct voltage 98 and to a terminal of the opposite polarity, shown in the drawing as the negative terminal, of the principal source of direct voltage 76. Voltage source 98 can take a variety of known forms as discussed above with regard to the source 48 of FIG. 1.

Inverter and motor control of the system of FIG. 3 is effected in accordance with a scheme similar to that discussed above with respect to FIG. 1. A similar source of control signals 108 are similar trigger circuitry for both a first gate control means shown as power controlled rectifier trigger circuits 110 and a second gate control means shown as shut-off controlled rectifier trigger circuits 112 are provided. As noted above with regard to FIG. 1, specifics regarding the requisite trigger circuitry and the overall control scheme are set out in detail in Ser. No. 60,398 and Agarwal et al. U.S. Pat. No. 3,323,032. Although the trigger outputs from trigger circuits 110 and 112 are represented by arrows, in an operating circuit a gate and a cathode connection between each controlled rectifier and its respective trigger circuit is required.

The timing and sequence diagrams of FIG. 2 apply directly to the operation of the FIG. 3 system. Basically, the operation is similar to that described for FIG. 1. Operation during the first 120° will be set forth below by way of example of the system operation. Joint consideration of the diagrams of FIG. 2 and the circuit schematic of FIG. 3 in the light of the example fully defines the motor supply system of the drawing.

At the outset of each cycle, at 0°, an SOC+ trigger pulse gates shut-off controlled rectifier 96 conductive to connect the shut-off capacitor, previously charged with the polarity indicated, through the shut-off controlled rectifier 96 across the series combination of power controlled rectifier 74 and the principal source of direct voltage 76. Power controlled rectifier 74 is reverse biased to shut off by the voltage on capacitor 106 as it opposes and exceeds the voltage of the source 76. After the controlled rectifier 74 ceases conduction, the capacitor 106 supplies the motor through a path including shut-off controlled rectifier 96, phase windings C and B, and power controlled rectifier 82. When the capacitor accumulates a full charge causing a polarity the opposite of that indicated, shut-off controlled rectifier 96 ceases conduction. Power controlled rectifier 70 is gated conductive at 0° by the A+ pulse to initiate a positive voltage interval for the phase winding A. Power controlled rectifier 70 is gated conductive subsequent to the shut-off pulse SOC+ but prior in time to the termination of conduction by shut-off controlled rectifier 96. Thus, from 0° to 60°, phase windings A and B are supplied excitation from the source 76. At 60°, the negative voltage pulse to phase winding B is terminated in accordance with the gating of shut-off controlled rectifier 102 by shut-off pulse SOB− applying the voltage of the shut-off source 98 serially with the voltage accumulated on capacitor lot (of polarity opposite to that indicated) to directly reverse bias power controlled rectifier 82. After power controlled rectifier 82 ceases conduction, capacitor 106 discharges its remaining voltage and recharges with the polarity indicated in a circuit path including the source of direct voltage 76, controlled rectifier 70, phase windings A and B, shut-off controlled rectifier 102, and the shut-off source of direct voltage 98. At the end of this charging interval, shut-off controlled rectifier 102 naturally commutes. At 60°, subsequent to the shut-off pulse SOB− but prior to the commutation of shut-off controlled rectifier 102, controlled rectifier 80 is gated conductive initiating a negative voltage interval for the phase winding C. Thus, from 60° to 120°, windings A and C are supplied excitation. At 120°, trigger pulse SOA+ gates shut-off controlled rectifier 92 to terminate conduction through power controlled rectifier 70. This commutation is similar to that described for terminating positive voltage to phase C at 0°, and the remaining motor operation is readily apprehended by joint consideration of the timing and sequence diagrams of FIG. 2 and the circuit schematic of FIG. 3.

Figure 4:
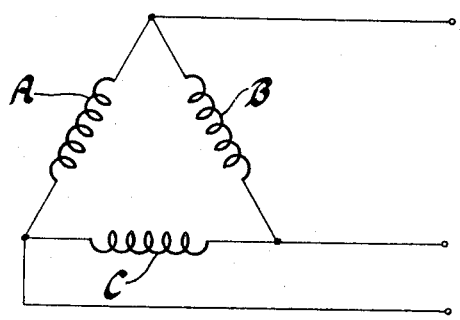
FIG. 4 is a circuit schematic of a Delta-connected induction motor winding suitable for substitution in the inverter of FIG. 3.

Reference should now be made to FIG. 4 where a Delta-connected induction motor winding including phases A, B, and C is shown. This winding connection can be readily substituted in the motor feed inverter arrangement of FIG. 3 by connecting the input terminals of this winding with the inverter in the same manner as the Y-connected winding is presently connected. The operation with the Delta-connected winding is readily comprehended from the description set forth above for the Y-connected winding.

Although the foregoing has proceeded in terms of particular examples, it should be understood that various changes and modifications could be engrafted thereon by one skilled in the art within the scope of the appended claims.

I claim:

1. An inverter power supply system for a three-phase AC induction motor comprising: a principal source of direct voltage having a positive output terminal and a negative output terminal; a three-phase AC induction motor having a winding including three winding feed terminals; a first group of three power controlled rectifiers having their anodes connected to said positive output terminal of said principal source of direct voltage and their cathodes connected respectively to said three winding feed terminals; a second group of three power controlled rectifiers having their cathodes connected to said negative output terminal of said principal source of direct voltage and their anodes connected respectively to said three winding feed terminals; a first gate control means connected to said power controlled rectifiers to sequentially and periodically gate them conductive to provide AC excitation to said induction motor in accordance with inverter action; a shut-off source of direct voltage having a positive output terminal and a negative output terminal; a first group of three shut-off controlled rectifiers having their anodes connected to said positive output terminal of said shut-off source of direct voltage and their cathodes connected respectively to the cathodes of said first group of three power controlled rectifiers; a second group of three shut-off controlled rectifiers having their cathodes connected to said negative output terminal of said shut-off source of direct voltage and their anodes connected respectively to the anodes of said second group of power controlled rectifiers; a shut-off capacitor connected between one terminal of said shut-off source of direct voltage having a first polarity and one terminal of said principal source of direct voltage having a polarity opposite to said first polarity; and a second gate control means connected to said shut-off controlled rectifiers and synchronized with said first gate control means to control the conduction times for said shut-off controlled rectifiers thereby controlling the times of commutation for said power controlled rectifiers, said shut-off controlled rectifiers alternately selectively connecting shut-off voltage to controlled rectifiers in said first and second groups of power controlled rectifiers, shut-off circuits for one of said groups of power controlled rectifiers including said principal source of direct voltage in voltage opposition to shut-off voltage accumulated on said shut-off capacitor, shut-off circuits for the other of said groups of power controlled rectifiers excluding said principal source of direct voltage but including said shut-off source of direct voltage for voltage addition with shut-off voltage accumulated on said shut-off capacitor.

2. An inverter power supply system for a three-phase AC induction motor comprising: a principal source of direct voltage having a positive and a negative output terminal; a three-phase AC induction motor having electrically isolated phase windings arranged as a three-phase induction winding; a plurality of power controlled rectifiers included in first and second current paths for each of said phase windings interconnecting each respective phase winding with said principal source of direct voltage, each of said current paths including a first power controlled rectifier connected between the positive terminal of said principal source of direct voltage and one end of its respective phase winding and a second power controlled rectifier connected between the negative terminal of said principal source of direct voltage and the other end of its respective phase winding, said power controlled rectifiers being poled such that excitation currents of both senses are controllably supplied each phase winding when respective power controlled rectifiers are selectively gated conductive; a first gate control means connected with said power controlled rectifiers to control the phase, frequency, and sense of currents supplied said phase windings; a shut-off source of direct voltage having a positive and a negative output terminal; a first group of three shut-off controlled rectifiers connected at their anodes with the positive terminal of said shut-off source of direct voltage, the cathode of each of said shut-off controlled rectifiers in said first group being connected to the cathode of a power controlled rectifier connecting the positive terminal of said principal source of direct voltage to a different one of said phase windings, whereby one of said first and second current paths supplying each phase winding is connected with a shut-off controlled rectifier of said first group of shut-off controlled rectifiers, the power controlled rectifiers connected with shut-off controlled rectifiers in said first group of shut-off controlled rectifiers defining a first group of power controlled rectifiers; a second group of three shut-off controlled rectifiers connected at their cathodes with the negative terminal of said off source of direct voltage, the anode of each of said shut-off controlled rectifiers in said second group being connected to the anode of a power controlled rectifier connecting the negative terminal of said principal source of direct voltage to a different one of said phase windings and included in one of said current paths supplying said phase windings which is not connected with a shut-off controlled rectifier included in said first group of shut-off controlled rectifiers, the power controlled rectifiers connected with shut-off controlled rectifiers in said second group of shut-off controlled rectifiers defining a second group of power controlled rectifiers; a shut-off capacitor connected between one terminal of said shut-off source of direct voltage having a first polarity and one terminal of said principal source of direct voltage having a polarity opposite to said first polarity; and a second gate control means connected to said shut-off controlled rectifiers and synchronized with said first gate control means to control the conduction times for said shut-off controlled rectifiers thereby controlling the times of commutation for said power controlled rectifiers, said shut-off controlled rectifiers alternately selectively connecting shut-off voltage to controlled rectifiers in said first and second groups of power controlled rectifiers, shut-off circuits for one of said groups of power controlled rectifiers including said principal source of direct voltage in voltage opposition to shut-off voltage accumulated on said shut-off capacitor, shut-off circuits for the other of said groups of power controlled rectifiers excluding said principal source of direct voltage but including said shut-off source of direct voltage for voltage addition with shut-off voltage accumulated on said shut-off capacitor.

* * * * *